(12) United States Patent
Cross et al.

(10) Patent No.: US 7,599,839 B2
(45) Date of Patent: Oct. 6, 2009

(54) ENABLING SPEECH WITHIN A MULTIMODAL PROGRAM USING MARKUP

(75) Inventors: Charles Cross, Wellington, FL (US); Leslie Wilson, Boca Raton, FL (US); Steven Woodward, Thousand Oaks, CA (US)

(73) Assignee: Nuance Communications, Inc., Burlington, MA (US)

( * ) Notice: Subject to any disclaimer, the term of this patent is extended or adjusted under 35 U.S.C. 154(b) by 45 days.

(21) Appl. No.: 12/029,330

(22) Filed: Feb. 11, 2008

(65) Prior Publication Data

US 2008/0215331 A1 Sep. 4, 2008

Related U.S. Application Data

(63) Continuation of application No. 10/733,610, filed on Dec. 11, 2003, now Pat. No. 7,356,472.

(51) Int. Cl.
*G10L 11/00* (2006.01)
*G10L 13/06* (2006.01)
*G10L 21/00* (2006.01)

(52) U.S. Cl. ............ 704/270.1; 704/275; 719/318
(58) Field of Classification Search ........... 704/270.1
See application file for complete search history.

(56) References Cited

U.S. PATENT DOCUMENTS

| 5,748,186 | A | 5/1998 | Raman |
| 5,867,160 | A | 2/1999 | Kraft et al. |
| 2002/0165988 | A1 | 11/2002 | Khan et al. |
| 2002/0194388 | A1 | 12/2002 | Boloker et al. |
| 2003/0018700 | A1 | 1/2003 | Giroti et al. |
| 2003/0023953 | A1 | 1/2003 | Lucassen et al. |
| 2003/0046316 | A1 | 3/2003 | Gergic et al. |
| 2003/0046346 | A1 | 3/2003 | Mumick et al. |
| 2003/0071833 | A1 | 4/2003 | Dantzig et al. |

FOREIGN PATENT DOCUMENTS

| CA | 2346606 | 5/2001 |
| EP | 1100013 | 5/2001 |

OTHER PUBLICATIONS

U.S. Appl. No. 09/544,823, filed Apr. 6, 2000, Maes, et al.
Farringdon, J., et al., "Co-Modal Browser—An Interface for Wearable Computers", Int'l. Symp. of Wearable Computers, pp. 45-51, (Oct. 1999).

(Continued)

*Primary Examiner*—David R Hudspeth
*Assistant Examiner*—Justin W Rider
(74) *Attorney, Agent, or Firm*—Wolf, Greenfield & Sacks, P.C.

(57) ABSTRACT

A method for speech enabling an application can include the step of specifying a speech input within a speech-enabled markup. The speech-enabled markup can also specify an application operation that is to be executed responsive to the detection of the speech input. After the speech input has been defined within the speech-enabled markup, the application can be instantiated. The specified speech input can then be detected and the application operation can be responsively executed in accordance with the specified speech-enabled markup.

7 Claims, 3 Drawing Sheets

OTHER PUBLICATIONS

Jang, Y.G., et al., "Design and Implementation of Korean Voice Web Browser", Abstract, Jour. of KISS: Computing Practices, vol. 7, No. 5, pp. 458-466, (Oct. 2001).

"A Complementary GUI System Using Web Browsers for Voice Application", IBM Corp., Research Disclosure, Art. 454190, pp. 360-361, (Feb. 2002).

Eisenzopf, J., "VoiceXML and the Future of SALT", Bus. Comm. Review, vol. 32, No. 5, pp. 54-59, (May 2002).

"Speech Application Language Tags (SALT) Tech. White Paper", SALT Forum, (Feb. 8, 2002).

"SALT Speech Application Language Tags (SALT) 1.0", SALT Forum, (Jul. 15, 2002).

Kleindienst, J., et al., "CATCH-2004 Multi-Modal Browser: Overview Description with Usability Analysis", IEEE: Multimodal Interfaces, pp. 442-447 (2002).

Trabelsi, Z., et al., "Multimodal Integration of Voice and Ink for Pervasive Computing", IEEE: Multimodal Interfaces, pp. 222-229 (2002).

Rouillard, J. "A Multimodal E-Commerce Application Coupling HTML and Voice XML", The Eleventh International World Wide Web Conference, Honolulu, Hawaii, May 2002.

Eberman, et al., "Building VoiceXML Browsers With Open VXI", Proceedings of the 11th International Conference in World Wide Web, 2002, pp. 713-717.

ENABLING SPEECH WITHIN A MULTIMODAL PROGRAM USING MARKUP

CROSS REFERENCE TO RELATED APPLICATIONS

This application is a continuation of, and accordingly claims the benefit from, U.S. patent application Ser. No. 10/733,610, now issued U.S. Pat. No. 7,356,472, which was filed in the U.S. Patent and Trademark Office on Dec. 11, 2003.

BACKGROUND

1. Field of the Invention

The present invention relates to the field of computer software and, more particularly, to multimodal applications.

2. Description of the Related Art

Currently, multimodal applications include a variety of interface types called modes. Input modes can include, for example, keyboard, pointing device, speech recognition, handwriting recognition, Dual Tone Multiple Frequency (DTMF), and the like. Output modes can include speech synthesis, visual displays, and the like. Multimodal applications permit users to interact with the application using a combination of graphical user interface (GUI) and speech modes.

When the application developer includes speech modes within an application, the application programmer can be required to implement highly complex algorithms. This is true even though the application developer may only desire to speech-enable a few GUI elements, such as a toolbar or menu option. Often the overhead required to speech enable one or more GUI elements is too expensive to economically implement. Accordingly, it would be advantageous to provide a simpler means to speech-enable application operations than those methods which have been conventionally used by software programmers.

Further, when a multimodal application renders a multimodal Web page, the multimodal application may not process speech input for both application operations and the Web page content in a coordinated fashion. For example, a single speech input can be interpreted one way by the application and can be simultaneously interpreted in a different way by a voice server that interprets voice-enabled markup of the Web page. More specifically, a speech input of "Next" can be interpreted by a speech-enabled Web browsing application as initiating an application operation that advances the application to another Web page. At the same time, the presently rendered Web page can display a plurality of records, where the speech input of "Next" can be recognized as a command to display the next set of records. Accordingly, the Web browser can behave in an unpredictable manner when the speech input of "Next" is received. It would be desirable to implement the application operations and the Web page content in a more unified manner.

SUMMARY OF THE INVENTION

The present invention provides a method, a system, and an apparatus for speech enabling an application. More specifically, the present invention can use markup, such as markup written in a Voice Extensible Markup Language (VoiceXML), to speech-enable one or more application operations. The markup can be interpreted by a markup interpreter embedded within the operating system upon which the application resides. In embodiments where the application can render Web pages, the markup interpreter can also be used to interpret voice-enabled markup contained within Web pages.

One aspect of the present invention can include a method for speech enabling an application. In one embodiment, the application can be written in a Markup language, such as Extensible Hypertext Markup Language (XHTML). In another embodiment, the application can be written in a standard coding language, such as C++ or Java. The method can include the step of specifying a speech input within a speech-enabled markup, such as a VoiceXML markup language. The speech-enabled markup can specify an application operation that is to be executed responsive to the detection of the speech input. After the speech input has been defined within the speech-enabled markup, the application can be instantiated. The specified speech input can then be detected and the application operation can be responsively executed.

In one embodiment, a speech-enabled markup interpreter can be provided within an operating system upon which said application is executed. The speech-enabled markup interpreter can be used to detect said speech input and responsively perform the application operation in accordance with the speech-enabled markup. In a further embodiment, a Web page can be rendered within the application, where the Web page can include speech-enabled markup for at least one element of the Web page. In such an embodiment, the speech-enabled markup interpreter can speech-enable the Web page element.

In another embodiment, the speech-enabled markup can be associated with a GUI element of the application. The GUI element can receive focus responsive to a GUI selection. When the GUI element receives focus, the speech-enabled markup can be activated so that the application starts monitoring audible input for the specified speech input. Further, when the GUI element loses focus, the speech-enabled markup can be deactivated so that the application no longer monitors audible input for the specified speech input.

Another aspect of the present invention can include a speech-enabled application, such as a multimodal Web browser. In one embodiment, the speech-enabled application can be written in a markup language. The speech-enabled application can include a GUI element configured to initiate at least one application operation responsive to a predefined GUI event. A speech-enabled markup can be associated with the GUI element. The speech-enabled markup can specify that the application operation be performed responsive to a speech input. A markup interpreter can be provided, which can be configured to interpret the speech-enabled markup and to initiate the application operation responsive to the detection of the specified speech input. The markup interpreter can be embedded within an operating system of a client computer in which the application is disposed. When the application is a Web browser, the markup interpreter can interpret speech-enabled markup contained within Web pages rendered by the application.

BRIEF DESCRIPTION OF THE DRAWINGS

There are shown in the drawings, embodiments that are presently preferred, it being understood, however, that the invention is not limited to the precise arrangements and instrumentalities shown.

DETAILED DESCRIPTION OF THE INVENTION

Figure 1:
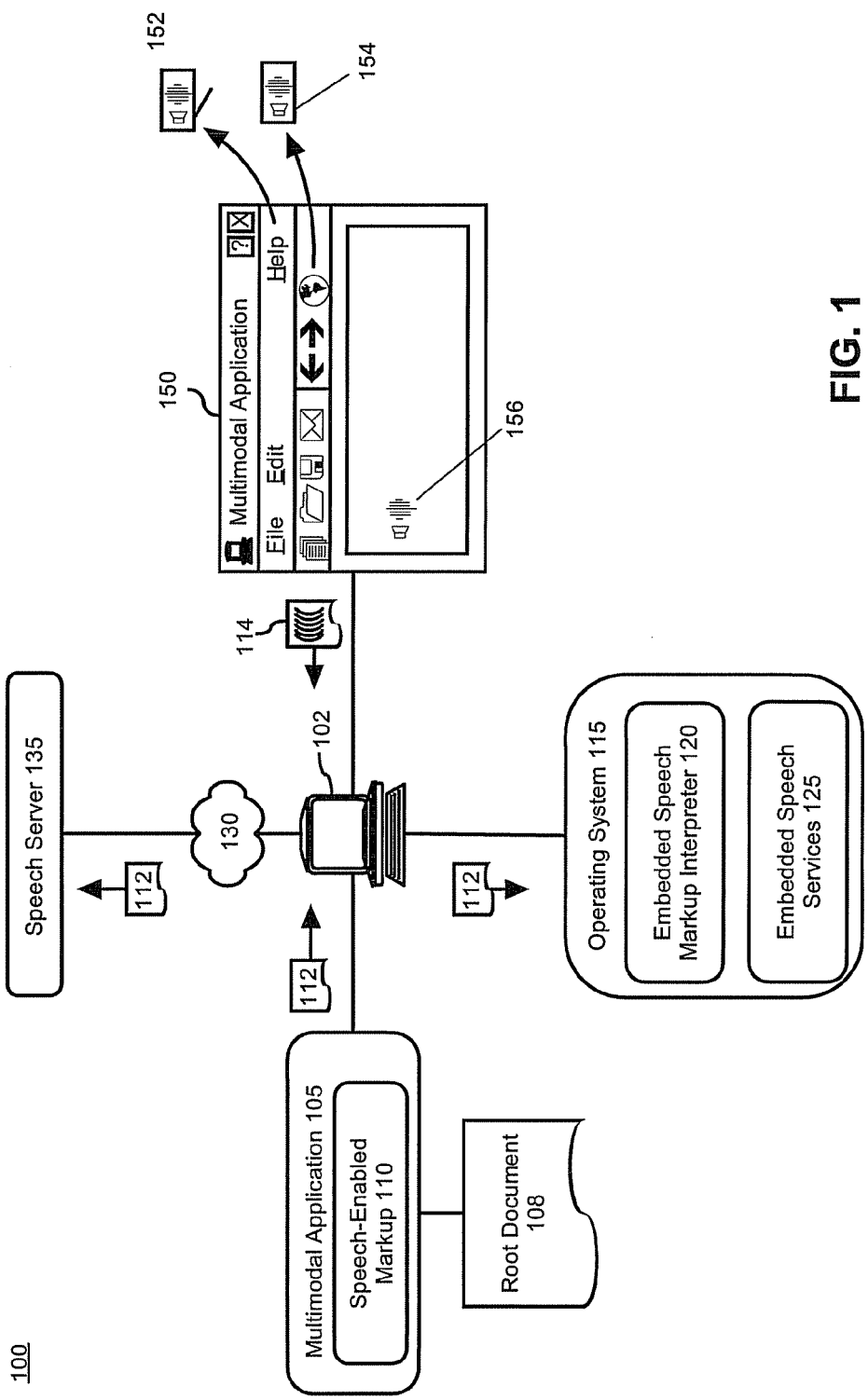
FIG. 1 is a schematic diagram illustrating a system for speech enabling an application in accordance with the inventive arrangements disclosed herein.

FIG. 1 is a schematic diagram illustrating a system 100 for speech enabling an application in accordance with the inventive arrangements disclosed herein. The system 100 can include a computing device 102 upon which operating system 115 and multimodal application 105 are disposed. The computing device 102 can include, for example, a desktop computer, a mainframe computer, a computing tablet, a personal data assistant, a cellular telephone, a video game console, a vehicle navigation system, a Web-enabled television peripheral, a Web-enabled household appliance, and/or the like. Further, the computing device 102 can represent a stand-alone device or a conglomeration of communicatively linked devices, such as a distributed computing system.

The multimodal application 105 can a software application that permits interactions using a combination of visual and speech modes, where a mode can be an interface type. For example, a multimodal application can respond to graphical user interface (GUI) events when operating in a visual mode and can respond to speech events when operating in a speech mode. Different modes can exist for input and output interfaces. Input modes can include modes for keyboard input, pointing device input, speech input, handwriting input, Dual Tone Multiple Frequency (DTMF) input, and the like. Output modes can include modes for synthetic speech output, visual output, printed output, and the like.

The speech-enabled features of the multimodal application 105 can be implemented using speech-enabled markup 110. The speech-enabled markup 110 can specify the behavior of the multimodal application 105 in regards to one or more speech mode. For example, the speech-enabled markup 110 can initiate a predefined event whenever a speech input 114 is received. The speech-enabled markup 110 can also be used to generate synthesized speech output. By specifying speech modes for application operations using the speech-enabled markup 110, developers can leverage pre-existing skills and/or software libraries conventionally utilized for speech-enabling content of Web pages when performing multimodal application 105 tasks.

The speech-enabled markup 110 can include a multitude of markup snippets 112 written in a speech-enabled markup language, such as Voice Extensible Markup Language (VoiceXML). Each markup snippet 112 can be associated with a particular element of the multimodal application 105. Whenever an element within an associated markup snippet 112 is active, the corresponding markup snippet 112 can be activated. The multimodal application 105 can monitor for speech events based upon all active markup snippets 112.

The multimodal application 105 can provide a GUI 150 through which user interactions can be conducted. The GUI 150 can include a multitude of visual elements including application element 152, application element 154, and content element 156.

Each visual element can be associated with one or more GUI modes. The application element 152 can be a menu bar element that can respond to particular mouse and keyboard inputs. For example, the application element 152 can present a cascading menu and/or initialize an application operation responsive to the receipt of a predefined input. The application element 154 can be a tool bar element, which can initiate one or more application operations when a selection of a visually presented button is made. The content element 156 can be any GUI element or set of GUI elements defined within the markup of a rendered Web page.

In addition to the GUI modes, the application element 152, the application element 154, and the content element 156 can each have one or more associated speech modes. Behavior for the speech mode of the application element 152 and the application element 154 can be defined by one or more markup snippets 112 included within the speech-enabled markup 110. Behavior for the speech mode of the content element 156 can be associated with speech-enabled markup or snippets thereof defined within the underlying markup of the currently rendered Web page.

There are a number of different ways in which the speech-enabled markup 110 of the multimodal application 105 can be used to enable features of the GUI 150. In one embodiment, whenever a visual element is activated, an associated markup snippet 112 can be conveyed to the operating system 115 upon which the multimodal application 105 is executed. The operating system 115 can include an embedded speech markup interpreter 120 as well as embedded speech services 125. Speech input 114 can be compared against monitored input and appropriate actions taken when a comparison results in a match.

In another embodiment, the speech-enabled markup 110 can be interpreted by a remote speech server 135 communicatively linked to the computing device 102 via a network 130. In such an embodiment, one or more markup snippets 112 can be conveyed to the speech server 135 as appropriate. The speech server 135 can also receive speech input 114 provided via the GUI 150. The speech server 135 can analyze the speech input 114 to determine when a speech event specified by an active markup snippet 112 has occurred. The speech server 135 can indicate an occurrence of a defined speech event to the multimodal application 105 so that suitable actions can be taken.

In a particular embodiment, a root document 108 can be used by the multimodal application 105 to represent application markup that is currently enabled. As events occur and the state of the multimodal application 105 and/or the state of a rendered Web page changes, suitable changes can be dynamically made to the root document 108. The root document 108 can be particularly useful in embodiments where at least a portion of the multimodal application 105 is written in a markup language, such as XHTML.

Figure 2:
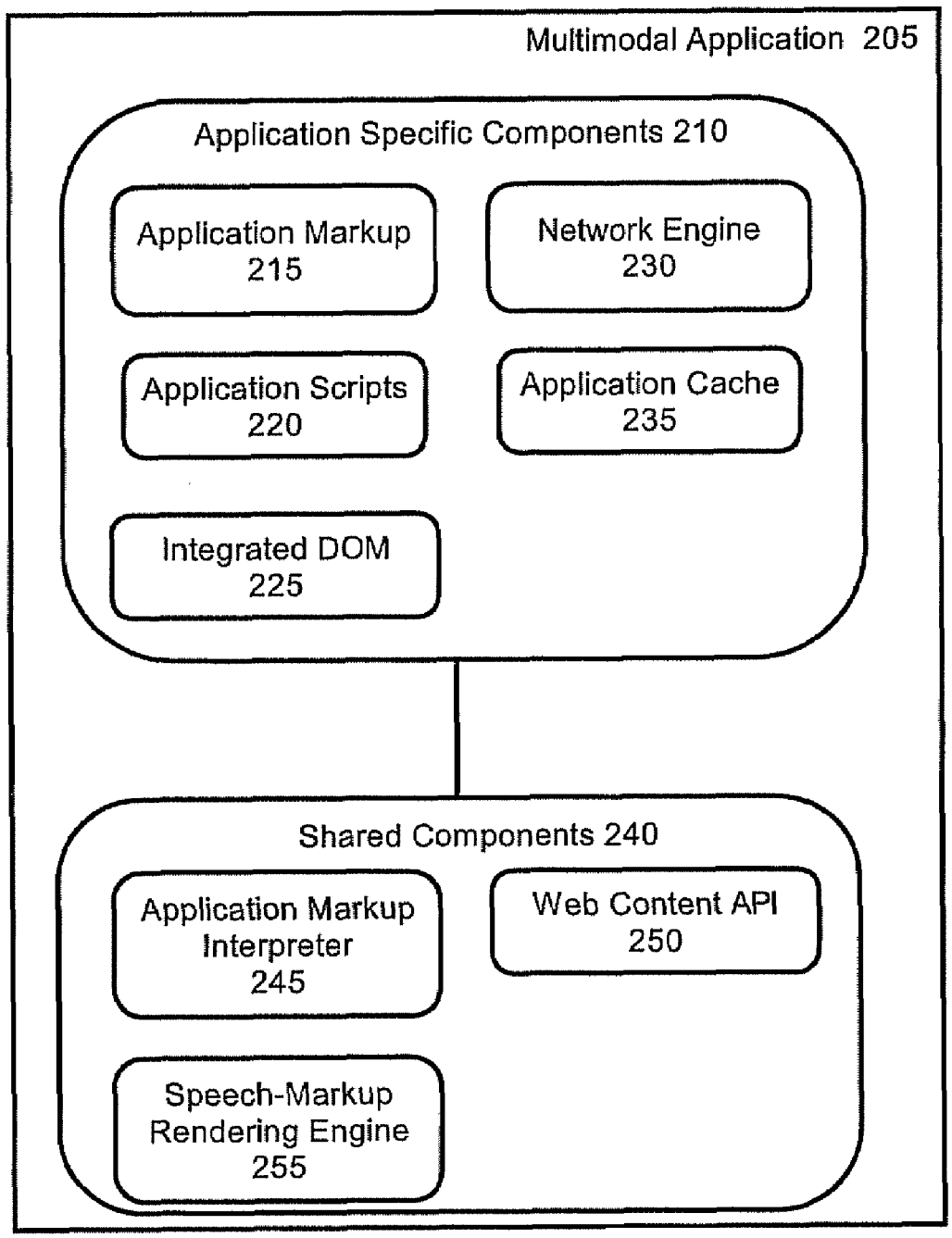
FIG. 2 is a schematic diagram of a multimodal application in accordance with the inventive arrangements disclosed herein.

FIG. 2 is a schematic diagram of a multimodal application 205 in accordance with the inventive arrangements disclosed herein. The multimodal application 205 can be one embodiment for the multimodal application 105 detailed within FIG. 1. One of ordinary skill in the art can appreciate, however, that other embodiments for the disclosed invention can exist based upon the details provided herein, and that the invention is not limited to the structure disclosed in FIG. 2.

The multimodal application 205 can include application specific components 210 and shared components 240. The application specific components 210 are those components specifically designed and tailored for the multimodal application 205. The application specific components 210 can include application markup 215, application scripts 220, an integrated document object model (DOM) component 225, a network engine 230, and/or an application cache 235.

Application markup 215 can include markup, such as markup written in XHTML that enables functions and features of the multimodal application 205. The application scripts 220 can include Java scripts, C++ scripts, and the like tailored for the multimodal application 205. The integrated DOM component 225 can define the structure and content of documents used by the multimodal application 205. It should be noted that the integrated DOM component 225 can include components that conform to the DOM model and can thereby define document interfaces in a platform and/or programming-language neutral manner. The network engine 230 can manage the links and associations for the multimodal application 205. The application cache 235 can be a memory space reserved for parameters, variables, temporary documents, and the like used by the multimodal application 205.

The shared components 240 can include components that can be utilized by multiple applications. The shared components 240 can include libraries, APIs, and/or code modules for speech generation, automatic speech recognition, markup interpretation, GUI presentation, event handling, and the like. The shared components 240 can include an application markup interpreter 245, a Web content API 250, and/or a speech-markup rendering engine 255.

The application markup interpreter 245 can implement the application markup 215, thereby enabling the application functions and features written in a markup language. The Web content API 250 can handle tasks relating to the rendering of Web pages within the multimodal application 205. The speech-markup rendering engine 255 can include routines necessary to handle speech tasks specified within a speech-enabled markup, such as VoiceXML.

Figure 3:
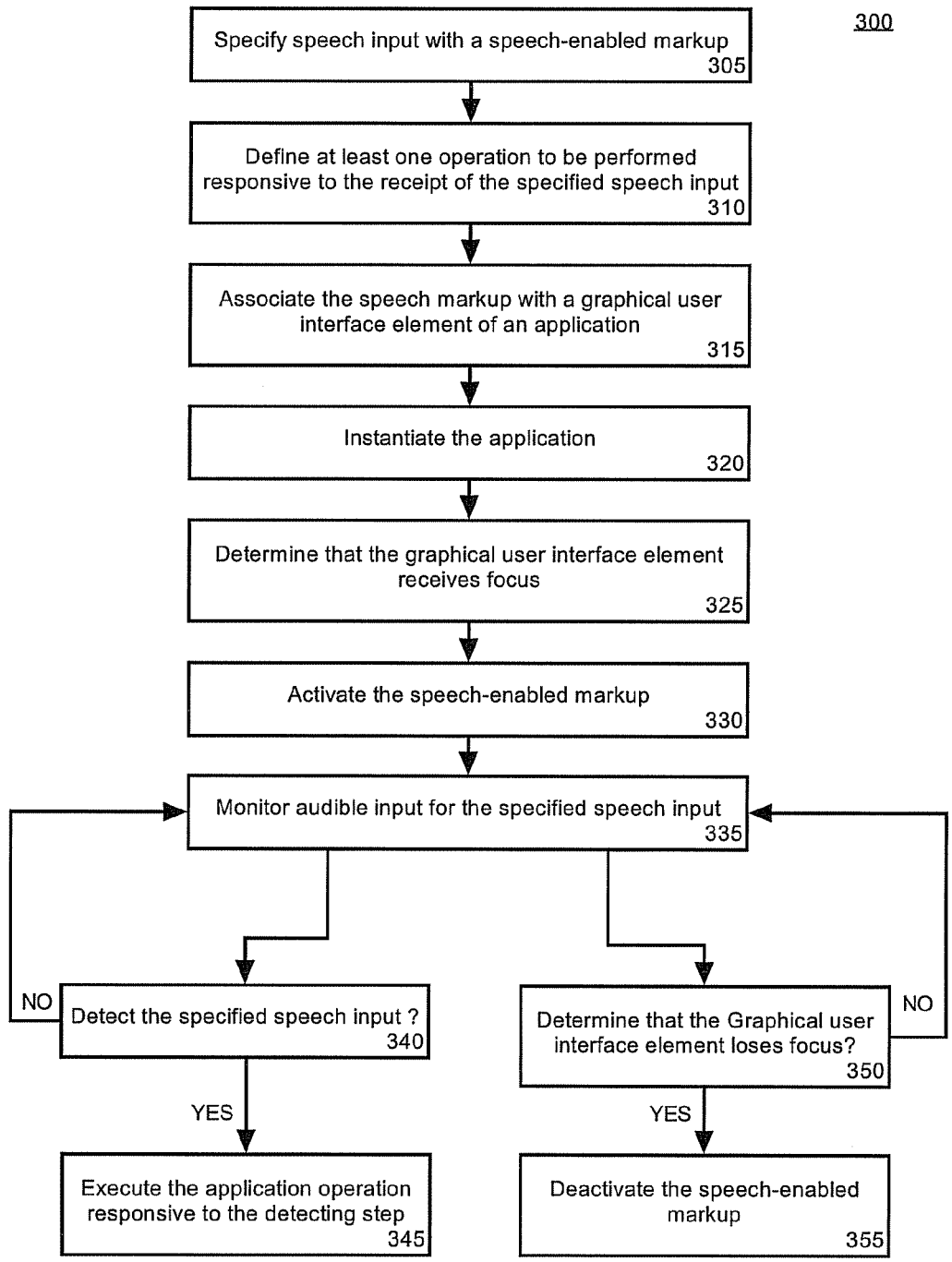
FIG. 3 is a flow chart illustrating a method for speech enabling an application in accordance with the inventive arrangements disclosed herein.

FIG. 3 is a flow chart illustrating a method 300 for speech enabling an application in accordance with the inventive arrangements disclosed herein. The method 300 can be performed in the context of a multimodal application that is speech-enabled using markup. The method can begin in step 305, where a particular speech input can be specified with a speech-enabled markup. In step 310, the speech-enabled markup can define at least one operation to be performed responsive to the receipt of the specified speech input. In step 315, the speech markup can be associated with a GUI element of the multimodal application. In step 320, after the speech-enabled markup has specified the speech-input, the application can be instantiated.

In step 325, a determination can be made that the aforementioned GUI element has received focus. In step 230, responsive to the focusing event, the speech-enabled markup can be activated. For example, the speech-enabled markup can be loaded into a markup interpreter, such as a VoiceXML interpreter, which can respond to speech events. In one embodiment, the markup interpreter can be embedded within the operating system in which the application is being executed. In step 335, audible input can be monitored for the specified speech input until the speech input is detected or until the GUI element loses focus.

In step 340, a determination can be made as to whether the specified speech input has been received. If not, the system can loop back to step 335, where the method can continue monitoring for speech input and/or a loss of focus event. If the specified speech input has been received, however, the method can proceed to step 345, where the application operation can be executed as specified within the speech-enabled markup.

Another event that can alter the monitoring state of step 335 is detailed in step 350. In step 350, a determination can be made as to whether the GUI element loses focus. If not, the method can loop to step 335, where the method can continue monitoring for the specified speech input or for a loss of focus event. If a loss of focus event is determined in step 350, the method can proceed to step 355, where the speech-enabled markup can be deactivated. When the speech-enabled markup is deactivated, the multimodal application can stop monitoring of the audio input for the specified input defined by the speech-enabled markup.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A machine-readable storage having stored thereon, a computer program having a plurality of code sections, said code sections executable by a machine for causing the machine to perform the steps of:

specifying a speech input with a speech-enabled markup;
  defining within said speech-enabled markup at least one operation of an application that is to be executed upon a detection of said specified speech input;
  associating said speech-enabled markup with a graphical user interface element of said application;
  after said defining and associating steps, instantiating said application;
  monitoring to determine whether said graphical user interface element receives focus;
  loading said speech-enabled markup into a markup interpreter and activating said speech-enabled markup if said graphical user interface element receives focus;
  monitoring audible input to determine whether said specified speech input is received when said speech-enabled markup is activated;
  executing said application operation if said specified speech input is received when said speech-enabled markup is activated;
  deactivating said speech-enabled markup so that said application no longer monitors audible input for said specified speech input if said graphical user interface element loses focus;
  wherein said markup interpreter is embedded within an operating system on which the application executes.

2. The machine-readable storage of claim 1, wherein said application is a multimodal Web browser.

3. The machine-readable storage of claim 1, further comprising the steps of:

rendering a Web page within said application, wherein said Web page includes speech-enabled markup for at least one element of said Web page, and wherein said speech-enabled markup interpreter speech-enables said Web page element.

4. The machine-readable storage of claim 1, wherein said application is written in a Markup language.

5. The machine-readable storage of claim 1, wherein said speech-enabled markup is written in a Voice Extensible Markup Language.

6. The machine-readable storage of claim 5, wherein said application is written in an Extensible Hypertext Markup Language.

7. A computer-based system for speech enabling an application, the system comprising:
- at least one processor for processing processor-executable instructions;
- means for specifying a speech input with a speech-enabled markup;
- means for defining within said speech-enabled markup at least one operation of an application that is to be executed upon a detection of said specified speech input;
- means for associating said speech-enabled markup with a graphical user interface element of said application;
- means for instantiating said application after said defining and associating steps;
- means for monitoring to determine whether said graphical user interface element receives focus;
- means for loading said speech-enabled markup into a markup interpreter and activating said speech-enabled markup if said graphical user interface element receives focus;
- means for monitoring audible input to determine whether said specified speech input is received when said speech-enabled markup is activated;
- means for executing said application operation if said specified speech input is received when said speech-enabled markup is activated;
- means for deactivating said speech-enabled markup so that said application no longer monitors audible input for said specified speech input if said graphical user interface element loses focus;
- wherein said markup interpreter is embedded within an operating system on which the application executes.

* * * * *